Figure 1:
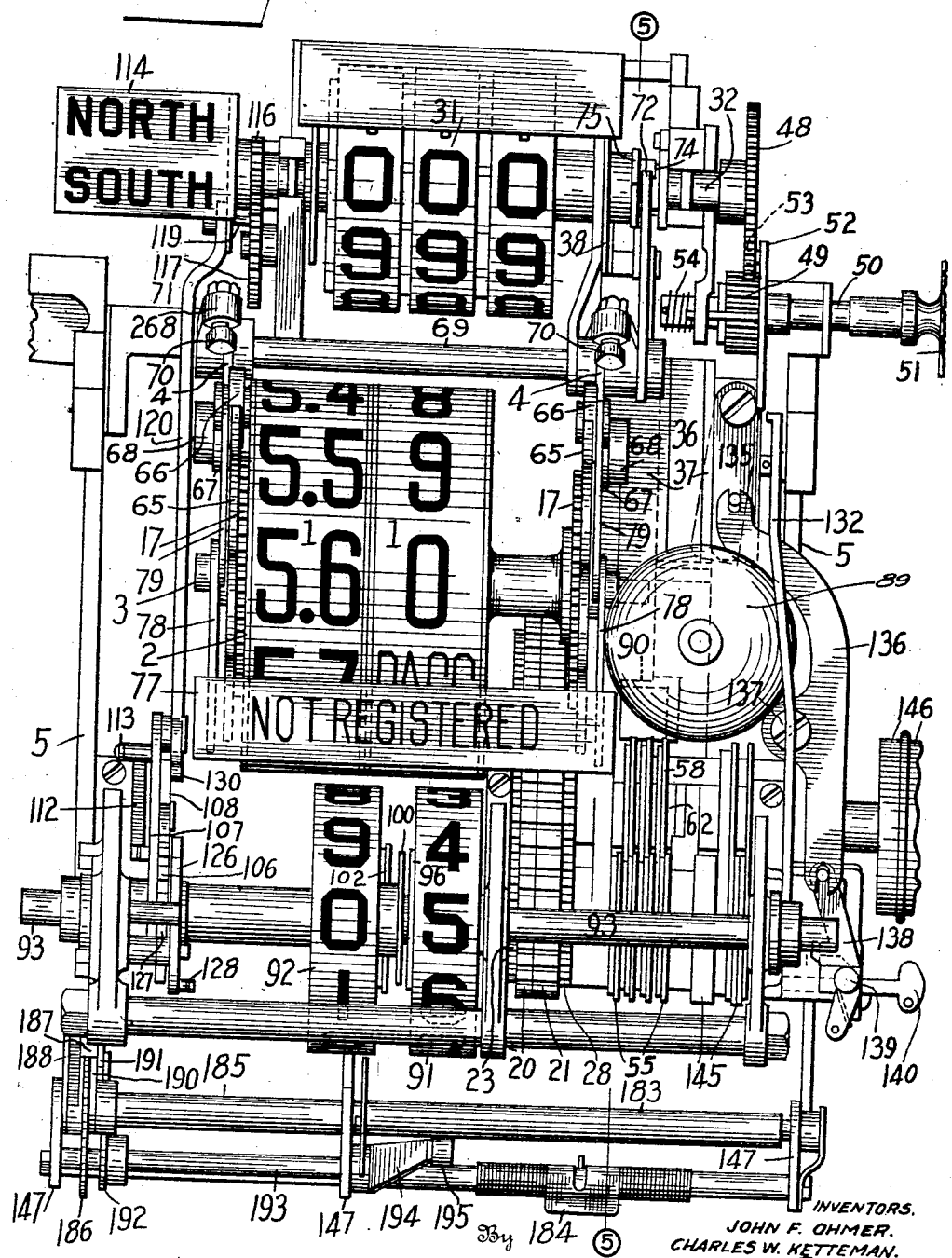

May 1, 1928.
J. F. OHMER ET AL
FARE REGISTER
Filed Feb. 8, 1922

1,668,024

9 Sheets-Sheet 1

INVENTORS.
JOHN F. OHMER.
CHARLES W. KETTEMAN.
Edward Reed Attorney

May 1, 1928.

J. F. OHMER ET AL

FARE REGISTER

Filed Feb. 8, 1922

1,668,024

9 Sheets-Sheet 6

Inventors
JOHN F. OHMER.
CHARLES W. KETTEMAN.

Attorney

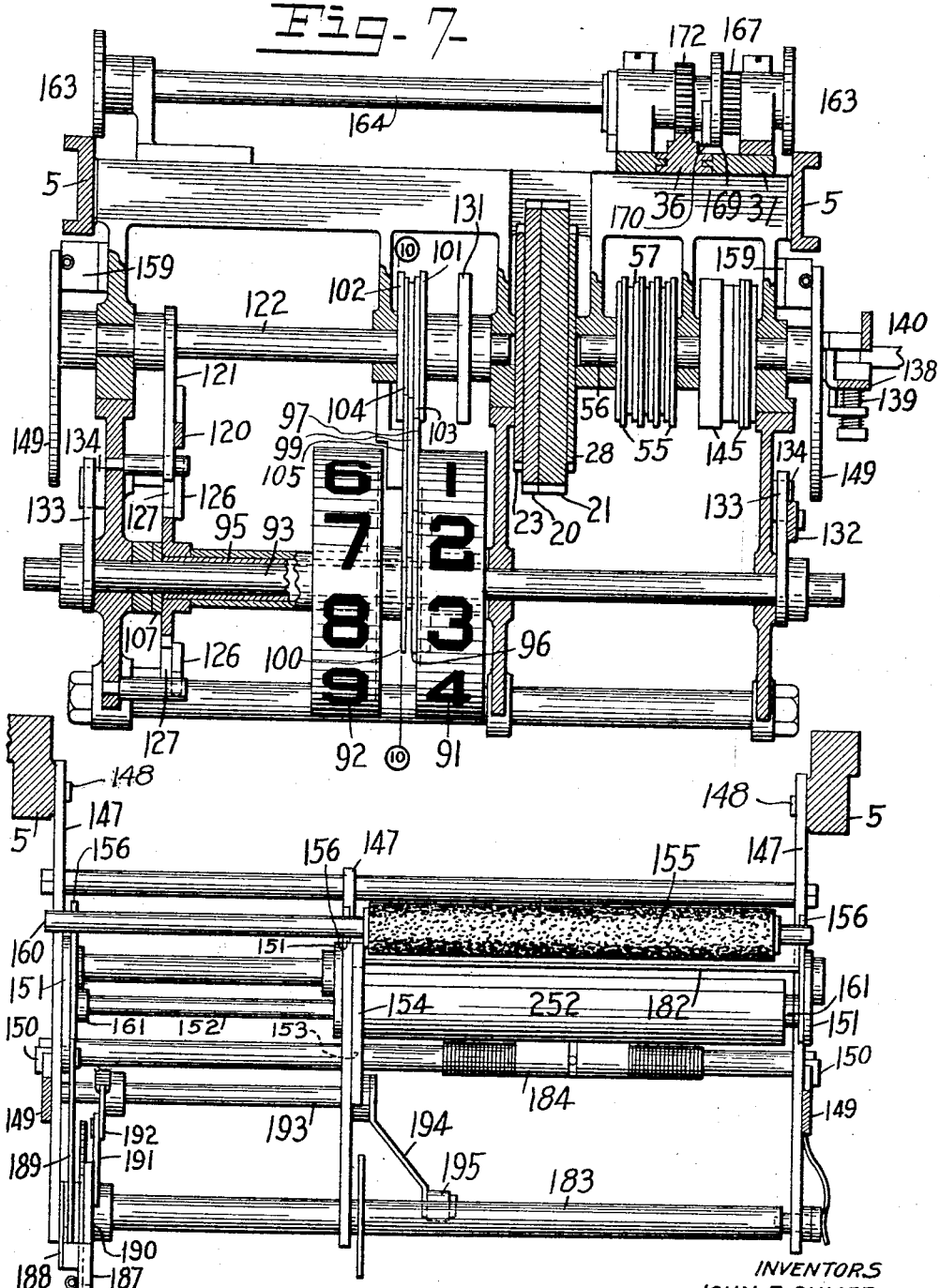

May 1, 1928.
J. F. OHMER ET AL
1,668,024
FARE REGISTER
Filed Feb. 8, 1922
9 Sheets-Sheet 8
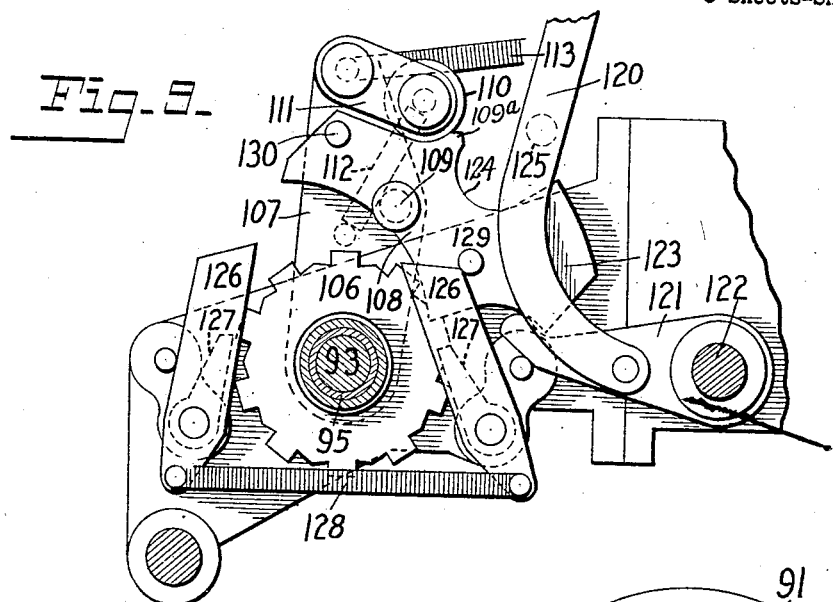
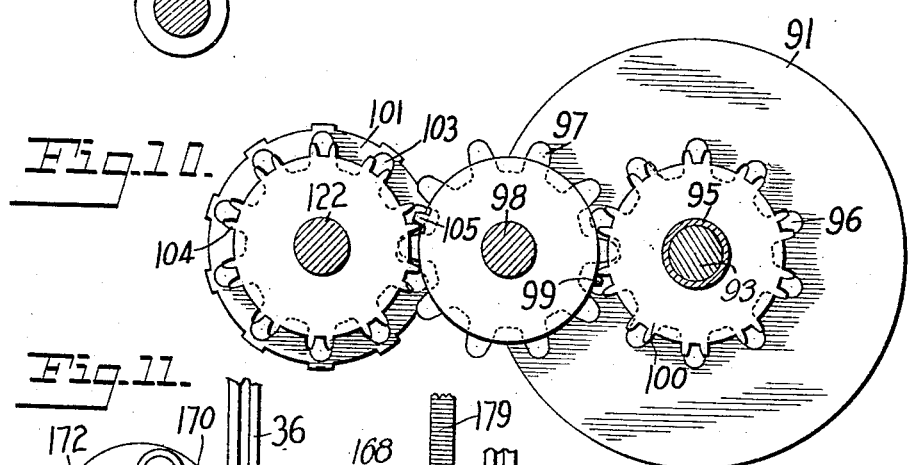
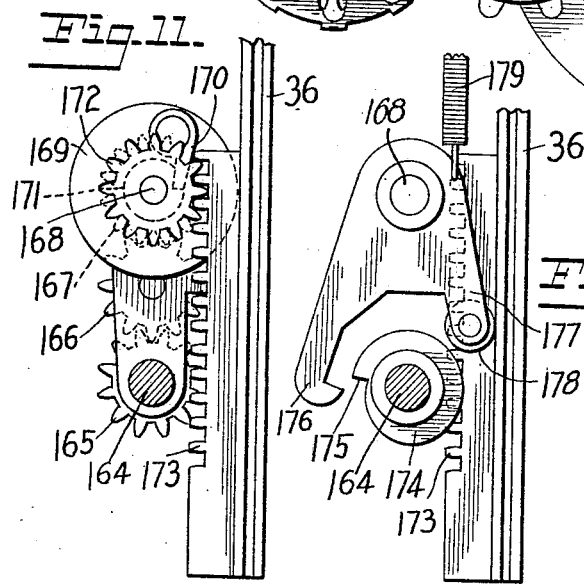
Inventors.
JOHN F. OHMER.
CHARLES W. KETTEMAN.
Attorney May 1, 1928.
J. F. OHMER ET AL
1,668,024
FARE REGISTER
Filed Feb. 8, 1922     9 Sheets-Sheet 9
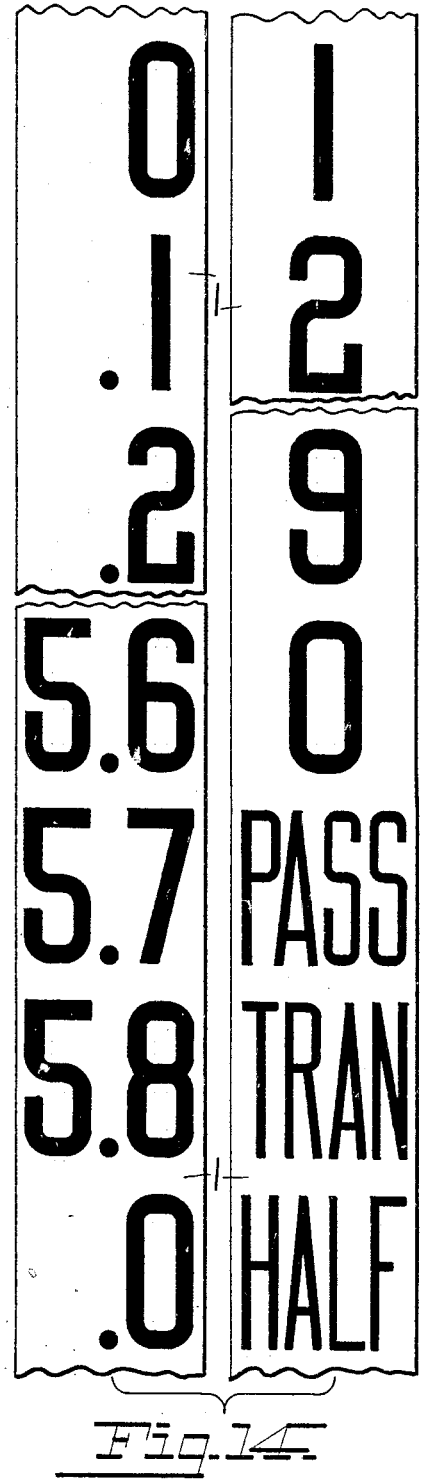
| ZONE. | DIRECTION. | FARE CLASS | TOTAL PASSENGER | | | 181 | MONTH. | DAY. | OPERATOR. |
|---|---|---|---|---|---|---|---|---|---|
| 01 | N | 10 | 5 | 8 | 6 | 8 | AUG | 7 | 9 |
| 01 | N | 05 | 5 | 8 | 6 | 7 | AUG | 7 | 9 |
| 01 | N | 0 HALF | 5 | 8 | 6 | 5 | AUG | 7 | 9 |
| 01 | N | 0 TRA | 5 | 8 | 6 | 4 | AUG | 7 | 9 |
| 01 | N | 75 | 5 | 8 | 6 | 3 | AUG | 7 | 9 |
| 01 | N | 71 | 5 | 8 | 6 | 2 | AUG | 7 | 9 |
| 01 | N | 93 | 5 | 8 | 6 | 1 | AUG | 7 | 9 |
| 02 | N | 209 | 5 | 8 | 6 | 0 | AUG | 7 | 9 |
| 02 | N | 0 COU | 5 | 8 | 5 | 9 | AUG | 7 | 9 |
| 02 | N | 0 R.T. | 5 | 8 | 5 | 8 | AUG | 7 | 9 |
| 02 | N | 111 | 5 | 8 | 5 | 7 | AUG | 7 | 9 |
| 02 | N | 133 | 5 | 8 | 5 | 6 | AUG | 7 | 9 |
| 02 | N | 200 | 5 | 8 | 5 | 5 | AUG | 7 | 9 |
| 03 | N | 188 | 5 | 8 | 5 | 4 | AUG | 7 | 9 |
| 03 | N | 0 SCH | 5 | 8 | 5 | 3 | AUG | 7 | 9 |
| 03 | N | 0 PAS | 5 | 8 | 5 | 2 | AUG | 7 | 9 |
| 03 | N | 0 MIL | 5 | 8 | 5 | 1 | AUG | 7 | 9 |
| 04 | N | 181 | 5 | 8 | 5 | 0 | AUG | 7 | 9 |
| 04 | N | 192 | 5 | 8 | 4 | 9 | AUG | 7 | 9 |
| 04 | N | 225 | 5 | 8 | 4 | 8 | AUG | 7 | 9 |
| 04 | N | 0 TRA | 5 | 8 | 4 | 7 | AUG | 7 | 9 |
| 04 | N | 0 COM | 5 | 8 | 4 | 6 | AUG | 7 | 9 |
| 05 | N | 13 | 5 | 8 | 4 | 5 | AUG | 7 | 9 |
| 05 | N | 80 | 5 | 8 | 4 | 4 | AUG | 7 | 9 |
| 05 | N | 50 | 5 | 8 | 4 | 3 | AUG | 7 | 9 |
| 05 | S | 107 | 5 | 8 | 4 | 2 | AUG | 7 | 9 |
| 05 | S | 140 | 5 | 8 | 4 | 1 | AUG | 7 | 9 |
| 04 | S | 0 MIL | 5 | 8 | 4 | 0 | AUG | 7 | 9 |
| 04 | S | 51 | 5 | 8 | 3 | 9 | AUG | 7 | 9 |
| 04 | S | 106 | 5 | 8 | 3 | 8 | AUG | 7 | 9 |
| 04 | S | 139 | 5 | 8 | 3 | 7 | AUG | 7 | 9 |
| 03 | S | 202 | 5 | 8 | 3 | 6 | AUG | 7 | 9 |
Fig.15.
Inventors.
JOHN F. OHMER.
CHARLES W. KETTEMAN.
Attorney Patented May 1, 1928.

1,668,024

UNITED STATES PATENT OFFICE.

JOHN F. OHMER AND CHARLES W. KETTEMAN, OF DAYTON, OHIO, ASSIGNORS TO OHMER FARE REGISTER COMPANY, OF DAYTON, OHIO, A CORPORATION OF NEW YORK.

FARE REGISTER.

Application filed February 8, 1922. Serial No. 535,039.

This invention relates to registers and while it has been designed primarily for use as a fare register on passenger carriers, such as interurban traction lines and suburban railways, it may be used in connection with registers of various kinds such as cash registers, for example, and for various other purposes.

One object of the invention is to provide a register which may be quickly and easily set and operated to indicate and record cash fares of any amount from one cent up to a relatively large amount and paper fares of various kinds.

A further object of the invention is to provide a register which can be set to indicate in penny multiples fares of relatively large amounts and requiring the setting of three digits on the indicator, by the use of but two operating, or setting, devices.

A further object of the invention is to provide such a register which will indicate and record the zone, or section of the route, in which a fare is collected.

A further object of the invention is to provide a register which will indicate and record the amount of the fare received, the zone in which it is received, the direction in which the vehicle is travelling and the number of passengers, and which will be simple in its construction and positive in its operation and which will be so constructed as to insure the accuracy of the record.

A further object of the invention is to provide such a device which will print on the record, in addition, to the other items relating to the fare, the date on which the record is made.

Other objects of the invention will appear as the device is described in detail.

Figure 2:
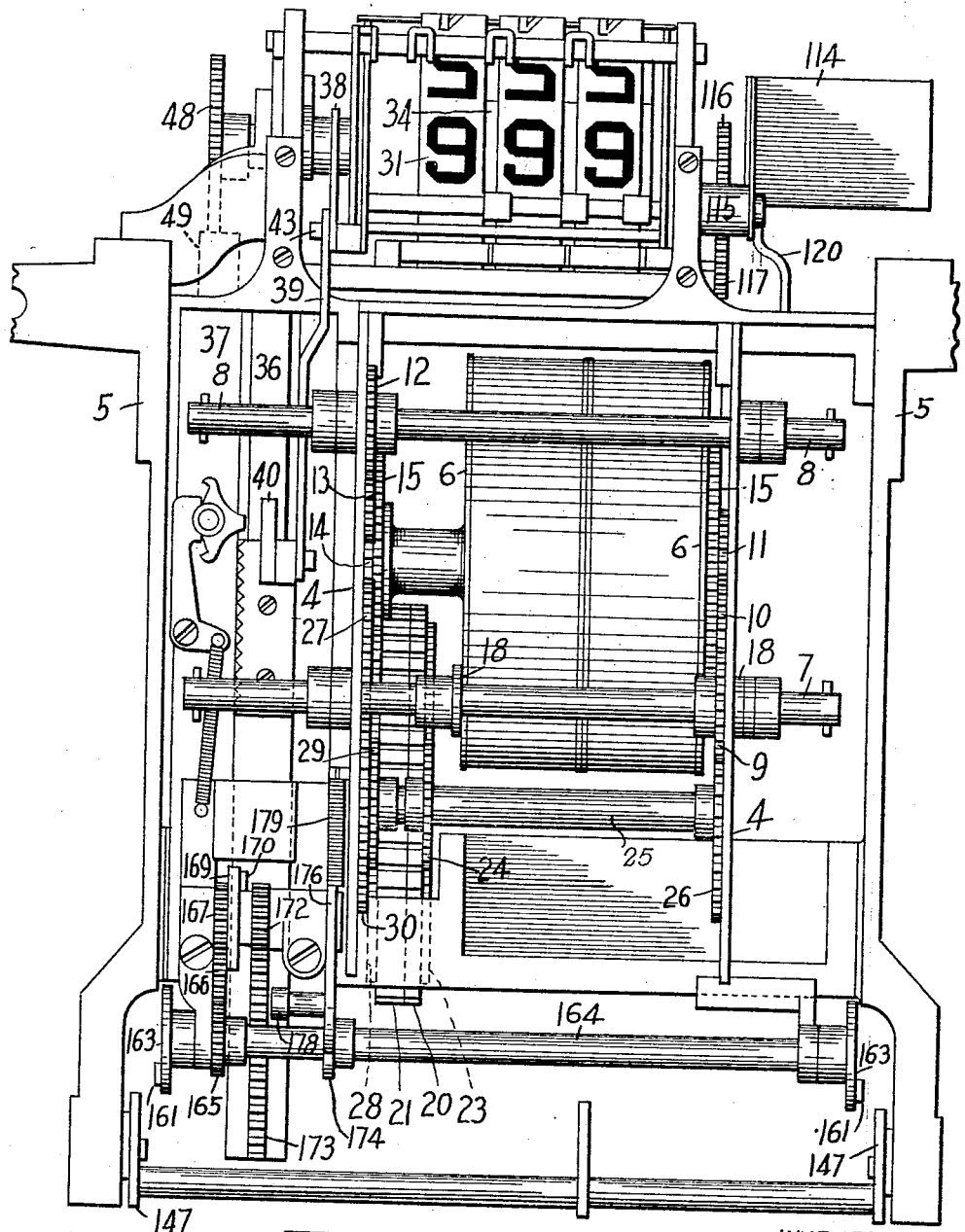
Figure 3:
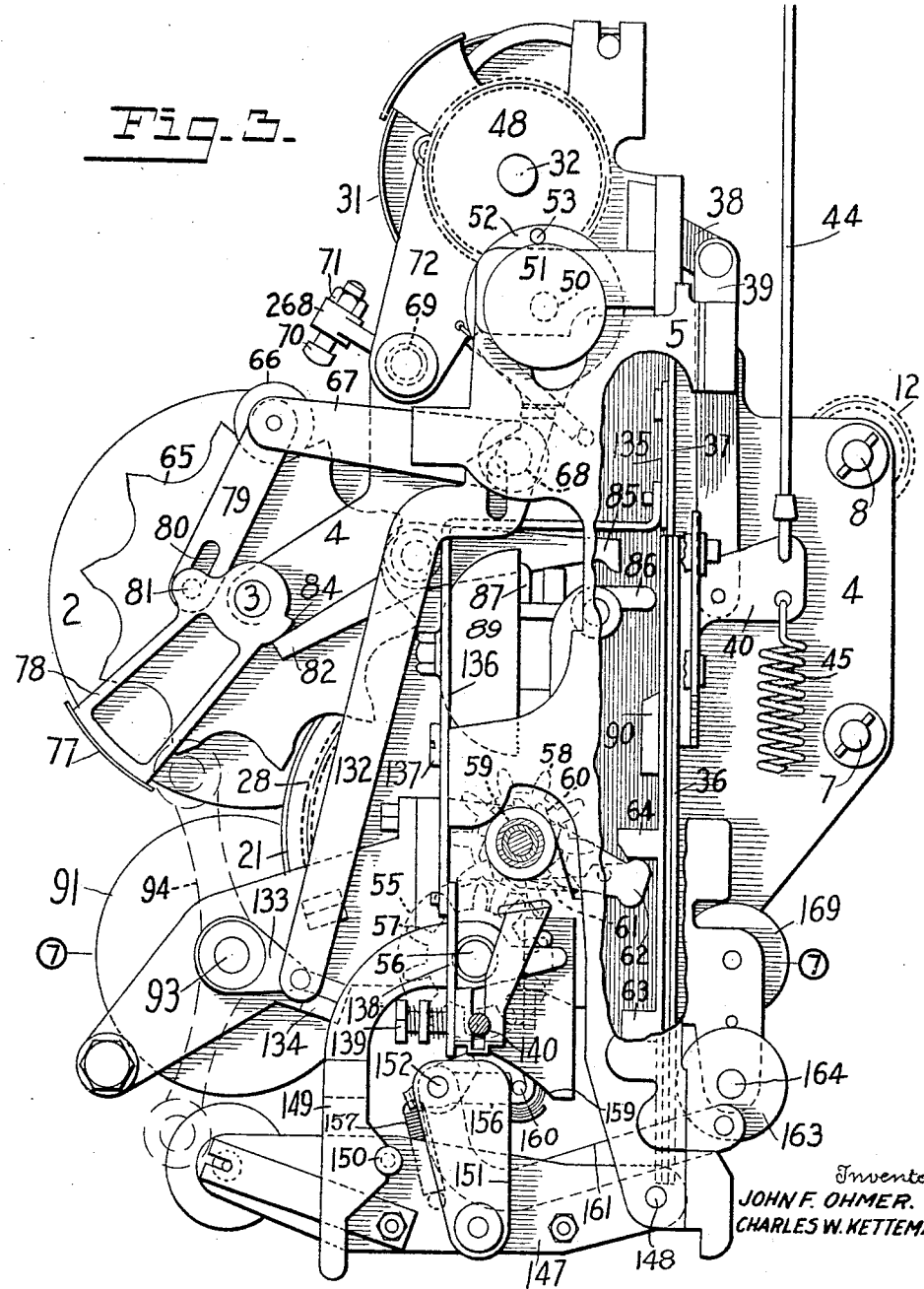
Figure 4:
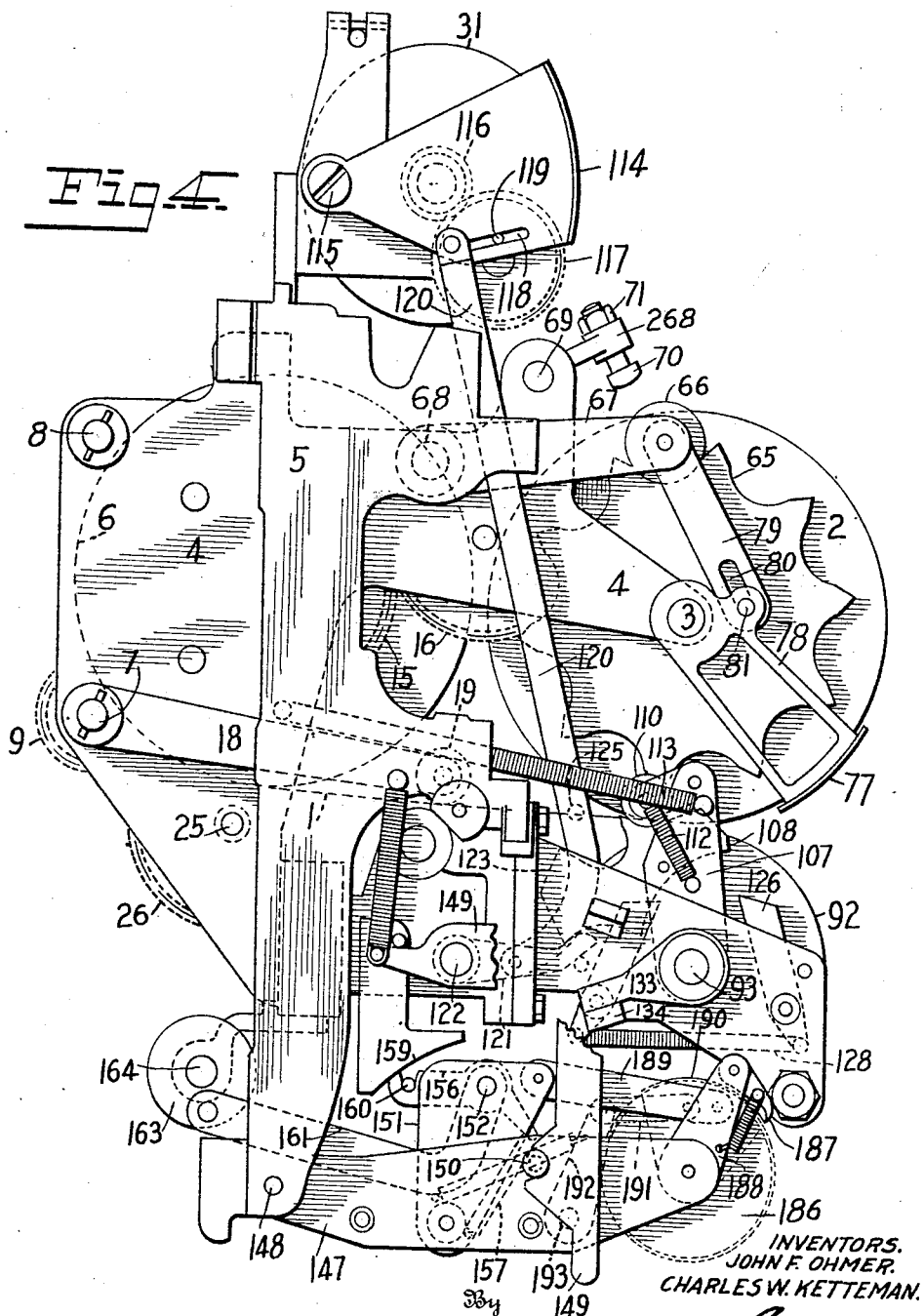
Figure 5:
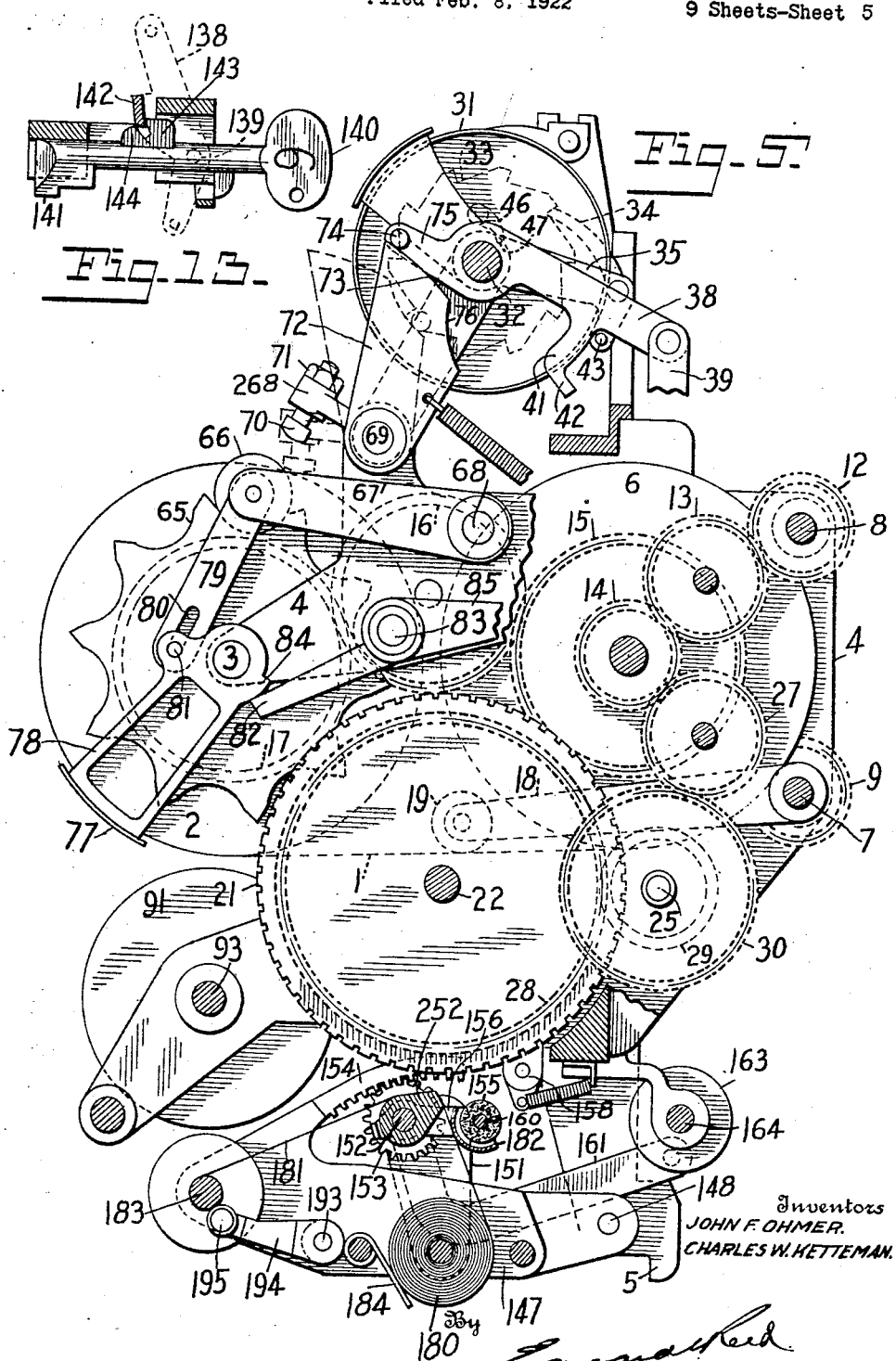
Figure 6:
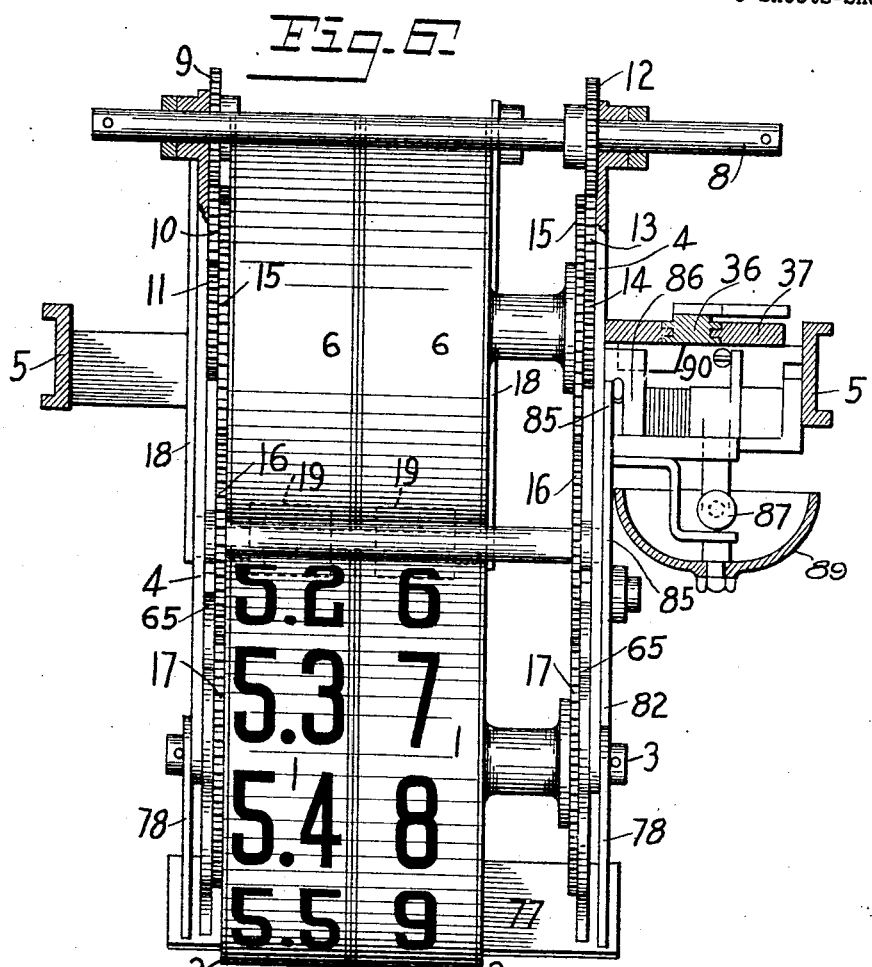
Figure 6A:
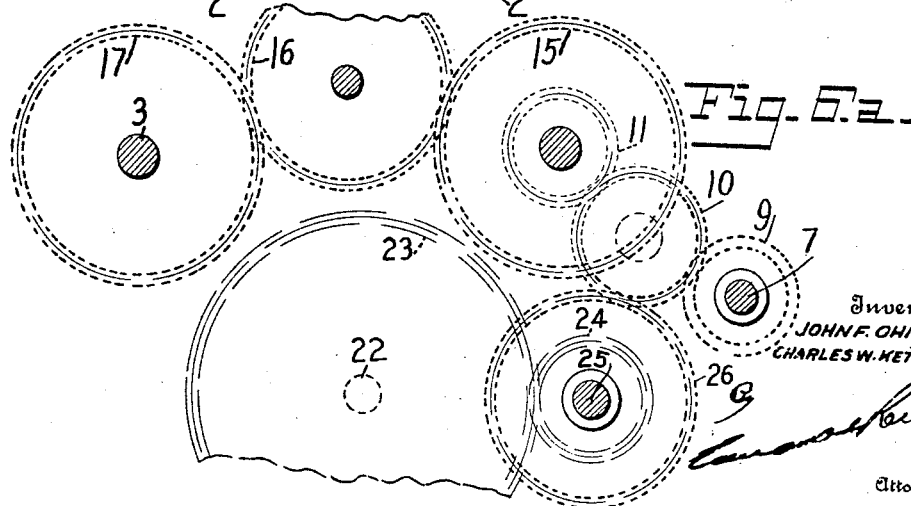

In the accompanying drawings Fig. 1 is a front elevation, partly broken away, and with the casing removed, of a register embodying our invention; Fig. 2 is a rear elevation of the same; Fig. 3 is an elevation of one side of such a register; Fig. 4 is an elevation of the other side of such a register; Fig. 5 is a section taken on the line 5—5 of Fig. 1; Fig. 6 is a horizontal section showing the fare indicating devices in plan; Fig. 6ª is a diagrammatic view of the gearing shown in Fig. 6; Fig. 7 is a horizontal section taken on the line 7—7 of Fig. 3, showing the zone indicators in plan; Fig. 8 is a detail plan view of the paper feeding mechanism; Fig. 9 is a detail view of the actuating mechanism for the zone indicators; Fig. 10 is a detail view of the transfer and printing counter actuating mechanism for the zone indicators; Fig. 11 is a detail view of the actuating device for the printing mechanism; Fig. 12 is a detail view of the overthrow stop for the printing mechanism; Fig. 13 is a detail view, partly in section, of the key controlled lock actuating device; Fig. 14 is a detail view of portions of the two indicator tapes; and Fig. 15 is a facsimile of a portion of a record produced by the register.

In these drawings we have illustrated one embodiment of our invention and have shown the same as comprising a fare indicator adapted to register items of three figures in penny multiples, from one cent up to a relatively large amount, which amount in the present instance is $5.89. This indicator comprises two indicating devices which are separately operable and one of which carries one series of digits and the other of which carries two series of digits, the digits being so arranged that by the proper adjustment of the two indicating devices they may be grouped to indicate any desired fare within the limits named. Two operating devices are provided which are connected with the respective indicating devices in such a manner that the latter may be quickly and easily adjusted to bring the desired digits into indicating position.

The two indicating devices, which constitute the fare indicator, may be of any suitable character and each may comprise one or more members. In the present construction, we have shown each indicating device as comprising a tape 1 preferably of metal and having thereon the desired indications. These tapes pass about drums 2 rotatably mounted on a shaft 3 carried by a supplemental frame 4 which is mounted within a main frame 5. While the tapes may be moved about the indicating drums 2 in various ways we prefer to connect each tape at one end with the corresponding drum 2 and at the other end with a similar drum 6 mounted in the frame 4 in the rear of the drum 2 and to provide means for actuating these drums in unison so that the tape may, at the will of the operator, be wound onto one drum and off the other. It will be noted that one of these tapes, the right hand tape in Figs. 1 and 14, is provided with the digits 0 to 9, inclusive, and with further symbols to indicate paper fares, such as passes, transfers and the like. The digits on this tape constitute the units digits of the fares indicated. On the other tape, at the left in Figs. 1 and 14, are two series of digits constituting respectively the tens and hundreds digits of the fares indicated. These digits run from 0 to any desired limit, this being determined by the length of the tape which it is desired to use, and in the present instance the numerals run from 0 to 5.8. It will be apparent, therefore, that by properly adjusting the two indicating devices, or tapes, any amount from one cent to $5.89 may be indicated and that any paper fare for which provision has been made may be indicated. The arrangement of the indicating devices and of the several series of digits with relation thereto is such that the desired fare may be indicated by the use of two operating devices only, thus overcoming the difficulties experienced with registering large fares in penny multiples where three separate indicating devices are employed and three separate operating devices used for actuating the same, and also avoiding the slowness of operation which results from transferring an amount from a unit indicating device to tens and hundreds indicating devices.

The setting, or operating, devices for actuating the indicating devices may be of any suitable kind. In the present instance we have mounted in the rear portion of the supplemental frame 4 two shafts 7 and 8 which are operatively connected with the respective indicating devices. The shaft 7 has secured thereto a gear 9, see Figs. 2, 5 and 6ᵃ, which meshes with an idle gear 10 which in turn meshes with a gear 11, which is connected with the drum 6 on the right hand side of Fig. 2, that is, the tens and hundreds drum. The shaft 8 has secured thereto a gear 12 which meshes with an idle gear 13 which in turn meshes with a gear 14 on the units drum. Secured to each drum is a gear 15 meshing with an idle gear 16 which in turn meshes with a gear 17 on the respective front, or indicating, drums, 2, the ratio of these gears being such that the drums are rotated at the same speed so that the tape will be wound onto and off the same uniformly. If desired, a tightening device may be provided for causing the tapes to fit snugly about the indicating drums and, as shown more particularly in Fig. 4, rock arms 18 are pivotally mounted on the shaft 7 and provided at their inner ends with a roller 19 which rests upon the tapes between the two drums, thus taking up any slack that there may be in the tapes. The operating, or setting, shafts 7 and 8 may be actuated in any convenient manner but the actuating devices are not here shown. However, the shafts are adapted to be connected at either end with operating rods which run lengthwise through the car, or to the conductor's station where all the fares are collected at one point. These rods are rotatable and may be quickly and easily operated to set the indicator.

The machine is designed to print a record of each fare registered or indicated on the fare indicator and we have, in the present machine, provided two type wheels, 20 and 21, the type wheel 21 bearing one series of digits and paper fare indications corresponding to the units indicating device, and the type wheel 20 bearing two series of digits corresponding to the tens and hundreds indicating device. The two type wheels are mounted on a shaft 22 for independent rotation thereon and the type wheel 20 has secured thereto a gear 23 which meshes with a gear 24 on a shaft 25 with which is connected a gear 26 meshing with an idle gear 10 which in turn meshes with the gear 11 connected with the rear drum 6 of the tens and hundreds indicating device, thus causing the type wheel 20 to rotate in unison with the tens and hundreds indicating device. The type wheel 21 has secured thereto a gear 28 similar to the gear 23 and which meshes with a gear 29 on the shaft 25, the gear 29 having secured thereto a gear 30 which meshes with an idler 27 in turn in mesh with the gear 14 of the unit drum 6, thus causing the type wheel 21 to be rotated in unison with the units indicating device.

The register is also provided with a passenger counter, or indicator, which indicates the number of passengers carried on each trip. As here shown, this counter comprises three indicator wheels 31 mounted on the shaft 32 and each bearing the digits 0 to 9, inclusive. The units counter wheel is connected with the tens counter wheel and the tens counter wheel is connected with the hundreds counter wheel by ordinary transfer mechanism so that the count is transferred from one counter to the other. The units counter wheel may be actuated in any suitable manner but as here shown it has secured thereto a ratchet wheel 33 (Fig. 5) with which cooperates a pawl 34 carried by an arm 35 pivotally mounted on the axis of the shaft 32. This pawl arm 35 is operated by a suitable actuating device which is preferably in the form of a slide bar 36 mounted in a suitable guideway 37 in the rear portion of the frame and at one side of the indicating devices. The slide bar is utilized to operate other parts of the mechanism and has a movement greater than is necessary for the operation of the passenger counter and we, therefore, have interposed between the slide bar and the pawl arm suitable mechanism which will cause a portion only of the movement of the slide bar to be transmitted to the pawl arm. As here shown, a second arm 38 (Figs. 3 and 5) is pivotally mounted on the axis of the shaft 32 and is connected by a link 39 with the slide bar, the lower end of the link preferably being connected with a lug or bracket, 40 projecting rearwardly from the slide bar. The arm 38 has an extension 41 provided with a finger 42 adapted to engage a pin 43 on the arm 35 when upward movement is imparted to the arm 38. The finger 42 is normally spaced a considerable distance from the pin 43 and, consequently, movement will not be transmitted to the pawl arm 35 until the slide bar has completed a portion of its movement, after which the finger will engage the pin and the pawl arm will be operated to advance the units counter wheel. As the arm 38 returns to its normal position the arm itself will engage the pin 43 and return the pawl arm to its normal, or lowermost, position. The slide bar may be actuated in any suitable manner but, as here shown, it is moved in one direction by a cord 44 connected with the lug, or bracket, 40 and adapted to extend through the car or to the operator's station alongside of the setting rods. The slide bar is moved in the opposite direction by means of a spring 45 also connected with the lug 40.

The passenger counter is reset at the end of each trip and to this end the counter wheels are loosely mounted upon the shaft 32 and are provided with pawls 46 adapted to be engaged by a one tooth ratchet wheel carried by the shaft and which is, in the present instance, formed by cutting a notch 47 in the shaft itself, so that the rotation of the shaft will cause this tooth to engage the pawls and carry the counter wheels to their zero positions. The resetting shaft 32 is operated by means of a gear 48 rigidly secured thereto and meshing with a pinion 49 carried by a shaft 50 which is mounted in the frame of the machine for both sliding and rotatory movement and is provided on its outer end, beyond the casing in which the machine is enclosed, but which is not here shown, with an operating knob 51. Secured to the shaft 50 alongside the pinion 49 is a plate 52 having secured thereto a pin 53 adapted to enter an opening in the gear 48 when the resetting shaft 32 is in its normal position. A spring 54 acts on the shaft 50 to hold the same in its innermost position with the pin 53 in the opening in the gear. The pinion 49 is of such a width that the shaft and plate 52 may be moved laterally far enough to disengage the pin from the gear without moving the pinion out of engagement with the gear. To operate the resetting shaft the shaft 50 is first shifted axially to disengage the pin 53 from the gear and is then rotated to actuate the gear and the resetting shaft. When the gear has been moved through a complete rotation the pin will again enter the opening therein, thus checking its movement and locking it in its normal position.

The passenger record is also printed on the record strip along with the amount of the fare but in the present machine this passenger record is never reset and, therefore, constitutes a total passenger counter, or what may be termed a consecutive numbering device, as each record will bear a number one higher than the preceding record, but this number is also an accurate count of the total number of passengers carried. To so record the number of passengers a series of type wheels 55 are mounted on a shaft 56 and each type wheel is provided with a gear 57 which meshes with a gear 58, on a shaft 59 (Figs. 3 and 7). The gear for the units type wheel has connected therewith a ratchet wheel 60 adapted to be actuated by a pawl 61 mounted on an arm 62 which is journaled on the axis of the shaft 59 and extends between two projections 63 and 64 on the slide bar 36. Consequently, upon each upward movement of the slide bar the pawl arm 62 will be elevated by the projections 63 and upon the downward movement of the slide bar the arm will be engaged by the projections 64 and actuated to advance the gear 58 and the units type wheel one space. Suitable transfer mechanism transfers the count from the units wheel to the other type wheels.

Means are provided for moving the fare indicating devices into true indicating position and for holding the same in that position during the registration of the fare and, because of the connection between the fare indicating devices and the fare printing type wheels the type wheels will also be alined and held against movement during the registering operation. As here shown, each of the drums 2 of the fare indicating device has secured thereto a toothed disk 65, the teeth of which are spaced apart to form recesses adapted to receive a projection or roller 66 carried by a rock arm 67 pivotally mounted on the frame at 68. The arm is normally free to move about its axis and as the drum is rotated the roller 66 will ride over the teeth of the disk 65 and will offer but little resistance to the rotation of the drum. The locking arm 67 is moved into and held in fixed engagement with the disk 65 during the operation of the registering mechanism by means of an arm 268 (Fig. 5) pivotally mounted at 69 and having a part arranged to engage the holding arm 67 when the arm 268 is rocked about its axis. In the present instance the engaging part of the arm 268 is in the form of a screw 70 extending through the arm 268 and held in adjusted position with relation thereto by means of a nut 71. Rigidly connected with the arm 268 is a plate, or arm, 72 having a cam shaped edge 73 arranged to be engaged by a pin 74 carried by an arm 75 secured to and forming an extension of the arm 38 which operates the passenger counter. The arrangement of the cam is such that when the slide bar is operated the pin 74 will act on the edge of the plate 72 to rock the latter about its axis and thus move the arm 268 into engagement with the holding arm 67, thereby forcing the roller 66 into the adjacent recess, and, if the recess has not been in perfect alinement with the roller, adjusting the plate 65 to bring the recess into line with the roller and thus bring the indicating drum and tape into the correct indicating position. The cam plate 72 is provided with a dwell, or curved surface, 76 so arranged that when the plate has been advanced by the operation of the pin 74 the surface 76 will lie substantially concentric with the axis about which the pin moves so that the pin is permitted to continue its movement but will hold the plate 72 in its forward position, thus retaining the holding arm 67 and roller 66 in locking engagement with the disk 65 throughout the movement of the slide bar.

As has been stated, the mechanism as a whole is included in a casing which is provided with sight openings through which the various indicators are visible, these openings being so arranged that they will show but one indication on each indicator. It is desirable that this sight opening should be closed during the adjustment of the indicators and for this purpose we have provided the fare indicator with a flash, or blind, 77 carried by arms 78 pivotally mounted on the axis of the drums 2 and adapted to be moved into a position in line with the sight opening whenever setting movement is imparted to the fare indicating devices and to be retained in that position until the fare has been registered. Preferably the flash bears the words "Not registered", thus showing that so long as the flash is in its operative position the fare has not been registered. In the present instance the flash is moved into its operative position by the movement imparted to either of the holding arms 67 by the rotation of the corresponding drum 2. This is accomplished by means of links 79 each of which is connected at one end with an arm 67 and has at its other end a slot 80 to receive a pin 81 carried by one of the arms 78 of the flash. The arrangement is such that the first movement of the drum which will cause the roller 66 to ride over one of the teeth of the plate 65 will elevate the flash. The flash is held in its elevated position by means of a detent 82 pivotally mounted at 83 and arranged to engage a shoulder 84 on the hub of one of the arms 78 of the flash. Because of the slotted connection between the link 79 and the flash, the holding arm 67 is free to rise and fall during the continued movement of the drum without altering the position of the flash. A trip arm 85 is secured to the detent 82 and is arranged to be actuated by the slide bar just before the latter completes its upward movement. In the present construction the rear end of the trip arm lies just above an actuating arm 86 for the tapper 87 of a bell 89 which sounds an audible signal whenever the operating mechanism is operated. The actuating arm 86 for the bell tapper lies in the path of a projection 90 carried by the slide bar and so arranged that it will operate the actuating arm to retract the tapper and will release the same to permit the tapper to operate just before the slide bar completes its upward movement. The end of the trip arm 85 being arranged just above the actuating arm 86 will be engaged and actuated by that arm when the latter is actuated by the slide bar, thus moving the detent 82 out of engagement with the stop 84 and permitting the flash to drop by gravity into its inoperative position.

The register is also provided with means to indicate and print the number of the zone, or section of the route, in which the vehicle is travelling at the time the fare is registered. The indicating device preferably comprises one or more indicating drums, depending upon the number of zones. In the present instance there are two zone indicating drums, a units drum 91 and a tens drum 92, both of which are mounted on a shaft 93 provided at one end, beyond the casing which encloses the machine, with one or more actuating arms 94 adapted to be connected with a cord, or cords, extending through the car. As shown in the drawings, Fig. 3, there are two arms extending in opposite directions so that if the machine is located at an intermediate position in the car the indicator may be operated from either side thereof. The indicator drums 91 and 92 are connected by suitable transfer mechanism so that the count will be transferred from the units down to the tens drum. As here shown, the units drum is mounted on a sleeve 95 journaled on the shaft 93 and the tens drum is rotatably mounted on the sleeve. Secured to the units drum (Figs. 7 and 10) is a ten tooth gear 96 which meshes with a similar gear 97 on the transverse shaft 98. Rigidly secured to the gear 97 is a one toothed gear 99 adapted to engage the teeth of a ten tooth Geneva gear 100 secured to the tens indicator wheel, thus causing the latter to be advanced one point for each complete rotation of the units counter wheel. In order that a record may be printed of the zone, type wheels 101 and 102 are mounted in axial alinement with the type wheels 55 and the units printing wheel has secured thereto a ten tooth gear 103 which meshes with the ten tooth transfer gear 97 and the tens printing wheel has secured thereto a ten tooth Geneva gear 104 adapted to be engaged by a one tooth gear 105 mounted on the transverse shaft 98 and secured to the ten tooth gear 97. Consequently, the printing counters will be actuated in unison with the indicators. Movement is transmitted from the shaft 93 to the units zone indicator through a suitable pawl and ratchet mechanism which, as here shown, comprises a ratchet wheel 106 (Fig. 9) rigidly secured to the sleeve 95 and adapted to be actuated by a pawl supported by the shaft 93. Preferably the pawl is a double nosed pawl which is reversible to enable the ratchet wheel to be operated in either direction, the teeth of the ratchet wheel being shaped to permit such operation. As here shown, an arm 107 is rigidly secured to the shaft 93 and has pivotally mounted thereon a pawl 108 having at each end thereof a nose. The pawl is pivoted at 109 and is provided adjacent to said pivot with a projection 109$^a$ with which cooperates a holding device, such as a roller 110, carried by an arm 111 pivotally mounted on the outer end of the pawl carrying arm 107 and acted upon by a spring 112 which holds the roller in engagement with the pawl and the projection thereon. When the pawl is in one position the roller will engage on one side of the projection 109$^a$ and yieldingly hold one nose of the pawl in engagement with the ratchet wheel and when the pawl is in the other position the roller will engage the other side of the projection and yieldingly hold the other nose of the pawl in engagement with the ratchet wheel. A spring 113 tends to move the pawl arm 107 in one direction and it is moved in the opposite direction by the actuating arms 94 on the shaft 93. Consequently, a rocking movement imparted to the shaft 93 will cause a similar movement to be imparted to the ratchet wheel, the direction of this movement depending upon the position of the pawl 108. The pawl may be shifted from one position to the other in any suitable manner but preferably this is accomplished by the resetting of the passenger indicator and in the present instance the direction indicator is utilized for this purpose. The direction indicator is in the form of a segmental drum, or curved plate, 114, (Figs. 1, 2 and 4) pivotally mounted adjacent to the end of the resetting shaft 32, as shown at 115. Mounted on the end of the resetting shaft is a pinion 116 which meshes with a gear 117 which carries the pin 119 which projects into a slot 118 in the direction indicator. The ratio of the gears 116 and 117 is two to one so that one complete rotation of the resetting shaft will impart a one-half rotation to the gear 117 and thus move the slot 118 from one side of the axis of the gear to the other side of that axis, thereby shifting the direction indicator from one position to the other. This direction indicator is connected by means of a pitman 120 with an arm 121 which is rigidly secured to a shaft 122 and the end of which lies beneath a projection 123 on the pawl 108. When the direction indicator is in its lower position and the word "North" is exposed the pawl 108 will be in the position shown in Fig. 9 and the projection 123 of the pawl will overlie the arm 121. When the direction indicator is shifted the arm 121 will be moved upwardly, thus rocking the pawl 108 about its axis on the arm 107 and forcing the projection 109 past the projection 110. It is not necessary that the pawl should be moved by the arm 121 to its final position as the roller 110 will complete the movement of the pawl as soon as the roller has passed the projection. The projection 123 has a cam surface 124 which will lie in the path of a pin 125 on the pitman 120 when the direction indicator is in its uppermost position so that the downward movement of the direction indicator will cause the pin to engage the cam surface of the projection and force the pawl 108 into its reversed position. In order to prevent the overthrow of the zone indicators we have pivotally mounted at each side of the ratchet wheel 106 an arm 126 having connected therewith a detent 127 adapted to be moved into and out of engagement with the teeth of the ratchet wheel by the movement of the respective arms. A spring 128 connected with the arms tends to move them in directions to carry the detents into inoperative positions. The upper ends of the arms 126 are beveled and are arranged respectively in the paths of pins 129 and 130 carried by the opposite ends of the pawl 108. When the pawl is in the position shown in Fig. 9 and is actuated by the rocking movement of the arm 107 the pin 129 will, upon each operative movement of the pawl, engage the beveled end of the adjacent arm 126 and force the detent 127 into the path of a tooth on the ratchet wheel, thus positively checking the movement thereof. As here shown, each tooth is provided at its base with a tapered recess into which the end of the detent extends, thus causing the detent to also act as an aligning device to properly position the indications on the zone indicators. When the pawl is in the position opposite that shown in Fig. 9 the pin 130 will act on the other arm 126 in the same manner. The shaft 122 with which the arm 121 is rigidly connected, and which is arranged in line with the shaft 56 bearing the type wheels 55, has mounted thereon a type wheel 131 to print a record of the direction in which the vehicle is moving. The type is so arranged upon the type wheel, which may be either a complete wheel or a segment, that the movement of the direction indicator from one position to another will impart a corresponding movement to the type wheel.

A locking device is provided which serves both to prevent the operation of the zone indicating device during the resetting of the passenger counters and to prevent the resetting of the passenger counters when the operating mechanism for the zone indicator has been moved from its normal position. As here shown, (Fig. 3) this lock comprises a bar 132 connected at its lower end with a crank arm 133 secured to the shaft 93 and having its upper end arranged adjacent to the lower edge of the plate 52 forming part of the resetting mechanism. When the actuating device for the zone indicators is operated the upper end of the bar 132 will be moved alongside of the plate 52 so as to hold the same against lateral displacement, thus preventing the plate from being disconnected from the gear 48. When the operating mechanism for the zone indicators is in its normal position the plate may be moved laterally and this movement will bring it into line with the upper end of the bar 132 and it will thus prevent the movement of that bar and, consequently, will prevent the operation of the operating devices for the zone indicator. The rock arm 133 on the shaft 93 also serves to limit the movement of the shaft 93 and to this end it is arranged between two stops 134 secured to an adjacent portion of the frame.

Means are also provided for locking the registering mechanism against operation until type has been set to print on the record a mark identifying the person operating the machine. As shown in Figs. 1 and 3, this lock is key controlled and comprises a locking member, or arm, 135 pivotally mounted on the frame adjacent to the guideway 37 and having its lower free end adapted to be moved into and out of the path of the part carried by the slide bar 36. In the present instance, the locking member moves into line with the slide bar itself and when in this position prevents the operation of the slide bar. Rocking movement is imparted to the locking member by means of a lever 136 pivotally mounted between its ends at 137 and connected at its lower end with a second lever 138 which is pivotally mounted at 139. This second lever is acted upon by a key 140 which sets the type to print the identifying mark on the record. As here shown, the type which prints the identifying mark is carried by the key, as shown at 141 (Fig. 13) and the opening in the main frame in which the key is inserted is so arranged that when the key is fully inserted the type will be in printing position. The second lever 138 is provided with a projection 142 which lies in the path of a lug, or projection, 143 carried by the key 140. Consequently, when the key is inserted in the slot, or guideway, in the frame its inward movement will cause the lug to engage the finger 142 and actuate the levers to move the locking member 135 into an inoperative position. The key is provided with a second lug 144 arranged in front of and spaced from the lug 143 and this second lug is of such a size that it will just clear the lower edge of the finger 142 when the lever 138 is in its normal position, that is, with the locking member 135 in operative position. Consequently, when the key is inserted the first lug 144 will pass the finger 142 and the latter will be engaged by the lug 143 and as the lever is moved inwardly the finger will swing down into the recess between the two lugs so that the withdrawal of the key will move the lever outwardly to restore the locking member 135 to its locking position. Consequently, the machine is in its unlocked position only when the key is inserted in the keyway. The machine is also provided with type wheels 145 arranged in axial alinement with the type wheels 55 and adapted to print the date on the record. These type wheels may be of any suitable character and may be operated in any suitable manner. As here shown, they are operated by knobs 146 arranged beyond the casing enclosing the mechanism, in a well known manner.

Suitable printing mechanism is provided by means of which a printed record may be taken from the several type wheels or printing devices employed in the machine, and this record is printed upon each operation of the register so as to provide a record of each individual fare. As here shown, the printing mechanism is carried by an auxiliary frame 147 comprising two side members pivotally mounted at their rear ends on the main frame, as shown at 148 (Fig. 8). These frame members are held in their upper, or operative position, by means of arms 149 pivotally mounted on the axis of the shaft 56 and having in their rear edges recesses to receive pins 150 carried by the side members 147 of the frame. Pivotally mounted on each side member of the frame is a supporting plate, or arm, 151 and these arms have mounted therein a shaft 152 on which is mounted a platen 252. As here shown, the platen has a portion projecting laterally from the body thereof and constituting the contact portion of the platen which presses the paper into contact with the type wheels. The platen is mounted for both a bodily swinging movement with the supporting members 151 and a rocking movement about the axis of the shaft 152. To this end the shaft 152 has secured thereto a gear 153 (Fig. 5) which meshes with a rack 154 rigidly secured to one of the side members of the frame 147. Consequently, when the supporting members 151 are rocked about their axis the platen will travel toward or from the printing devices and will also be rocked about its longitudinal axis to move the contact portion thereof into and out of a position to engage the type. An inking roller 155 is carried by arms 156 mounted on the shaft 152 and acted upon by a spring 157 which tends to move the inking roller toward the type wheels. In the present construction of the machine it is desirable that the inking roller should be depressed when the supporting devices move rearwardly in order to maintain it out of contact with the alining devices for the type wheels, which are shown at 158. We have, therefore, provided cams 159 on the side members of the frame which engage a shaft 160 which carries the inking roller and which control the position of the inking roller. The cams are so arranged that when the supporting members, or carrier, 151 move forwardly the inking roller will travel forwardly and upwardly into contact with the type wheels, thus applying ink thereto. When the carrier is moved rearwardly the inking roller is depressed and the platen is moved into contact with the type, this being accomplished by the rearward bodily movement of the platen and its rocking movement about its axis. The contact of the platen with the type, or rather with the paper which is interposed between the same and the type, takes place when the carrier 151 is in its rearmost position and in order to move the platen away from the type wheels to permit of the further operation thereof the carrier is moved forwardly into the position shown in Fig. 5. The carrier may be oscillated by any suitable mechanism but as here shown this movement is imparted to the carrier by pitmen, or connecting bars, 161 which are connected at their forward ends to the carrier, preferably through the medium of the shaft 152, and at their rear ends with disks 163 mounted on a shaft 164. Rigidly secured to the shaft 164 is a pinion 165 (Figs. 2 and 11) which meshes with an idle pinion 166 which in turn meshes with a pinion 167 on a shaft 168. The pinion is loosely mounted on the shaft and has connected thereto a disk 169 carrying a pawl 170 which engages a one tooth ratchet wheel 171 secured to a gear 172 mounted on the shaft 168 when this gear is rotated in one direction. The gear meshes with a rack 173 connected with and forming a part of the slide bar 36. It will be apparent, therefore, that upon the upward movement of the slide bar the disk 169 will be rotated by the gear 172 and this motion will be transmitted to the pitmen 161, thus causing the operation of the printing mechanism. Upon the return movement of the slide bar the pawl 170 will ride over the periphery of the ratchet wheel and the disk 169 will not be operated. It will be noted in this connection that the total passenger recorder, or consecutive number printing device, 55 is actuated by the slide bar upon the downward, or return, movement of the same. Consequently, the record is printed before the total passenger counter is operated, and for this reason the passenger counter is normally set to print one number in advance of the actual count so that the record taken always shows the exact number of passengers carried. Inasmuch as this counting device is not visible and the record is only taken by the printing mechanism the fact that it is set ahead of the actual count is unimportant.

Means are also provided to prevent the overthrow of the printing mechanism and to bring the same to a stop in a predetermined position. To this end we have mounted on the shaft 164 (Fig. 12) a disk or one tooth ratchet wheel 174 having a tooth, or shoulder, 175 with which cooperates a pawl 176 pivotally mounted on the shaft 168 and having connected therewith an arm 177 carrying a roller 178 which bears against the slide bar 36 and is so arranged that it will normally hold the pawl 176 out of the path of the shoulder 175 on the disk 174, but will slip off the end of the slide bar and permit the pawl to be moved into the path of the shoulder 175 just as the slide bar completes its upward movement, the movement of the pawl being imparted thereto by a spring 179. The movements of the parts are so timed that the pawl will engage the shoulder and check the movement of the shaft just as the printing mechanism reaches its final position.

The paper on which the record is printed is carried in the form of a roll, as shown at 180, and the web of paper 181 is carried upward about a platen, a shield 182 serving to hold the same out of contact with the inking roller, and is carried from the platen forwardly to a rewinding roller 183 upon which it is wound and which serves as a paper feeding device. A tension device 184 bears on the roll to resist its rotation and thus prevent it from rotating after the movement of the rewinding roller has ceased. The rewinding roller 183 is removably mounted in the swinging frame 147 and is operatively connected with a shaft 185 journaled in the frame 147. This shaft has mounted thereon, near its outer end, a ratchet wheel 186 which is operated by a pawl 187 carried by a pawl arm 188 pivotally mounted on the axis of the ratchet wheel and this arm is connected by a link 189 with one of the supporting members, or carriers, 151 for the platen, so that, upon each forward movement of the platen carrier, rotation will be imparted to the rewinding roller. It will be noted that in the operation of the platen it is moved from a central position forwardly and then moved to the extreme rearward position and then forward to the central or intermediate position. Consequently, a part of the feeding movement will be imparted to the paper at the end of one printing operation and the remainder of the feeding movement will be imparted thereto at the beginning of the next printing operation, the two movements being sufficient to advance the paper the desired distance. As the paper is wound up on the rewinding roller the latter is increased in diameter and a given movement of the roller will advance the paper increasing distances as the diameter of the roller increases. To avoid this result and secure a uniform feed to the paper we have provided means controlled by the diameter of the roll of paper on the rewinding roller to regulate the rotatory movement imparted to the rewinding roller. To accomplish this we have mounted on the axis of the ratchet wheel 186 a segmental plate, or cam, 190, the edge of which projects slightly beyond the periphery of the ratchet wheel 186 and will engage the pawl 187 and hold the same out of engagement with the ratchet wheel. This segmental plate is connected by a link 191 with an arm 192 secured to a shaft 193 on the inner end of which is mounted a second arm 194 having a roller 195 arranged to bear upon the surface of the roll of paper on the rewinding roller, the arrangement being such that as the diameter of the roll increases the plate 190 will be moved forwardly so as to hold the pawl out of engagement with the ratchet wheel for increasing distances. Inasmuch as the pawl has a limited forward movement it will be apparent that as the plate moves forward the pawl will move the ratchet wheel shorter distances, thus decreasing the amount of rotatory movement imparted to the rewinding roller as the diameter of the roll of paper thereon increases.

The operation of the mechanism as a whole will be readily understood from the foregoing description of the several parts thereof and the various operations necessary to effect the registering and recording of the data relating to a single fare may be stated briefly as follows, the next to the last record shown at the bottom of Fig. 15 being used for the purpose of illustration: The operator's key 140, which must be inserted in the machine to release the same for operation, carries the identifying number, 9, and the insertion of the key places this number in printing position. The date printing wheels 145 are set to print the correct date at the beginning of the first trip on each day, by the manipulation of the setting knobs 146, and remain set throughout the day. The car having just passed from the third zone to the fourth zone the operator actuates the shaft 93 of the zone registering mechanism, by manipulating the arm 94, to cause the ratchet mechanism, shown in Fig. 9, to shift the zone indicating and recording wheels one point. Inasmuch as the direction indicator has already been set to indicate South no change in this is made. A fare of $1.39 having been collected the shafts 7 and 8 are manipulated to cause the fare indicators, and the fare printing wheels, to be so set that the numeral 9 will appear on the units indicator drum and the numerals 1.3 will appear on the tens and hundreds indicator drum, thus indicating the total fare of $1.39. The setting of the indicator also actuates the type wheels to move these same numerals into printing position. The operator then pulls the cord 44 to actuate the slide bar 36 and, through the mechanism shown in Fig. 11, the upward movement of the slide bar actuates the printing mechanism to cause a record to be printed from the several type wheels. The total passenger, or consecutive number, counter is operated on the reverse stroke of the slide bar and is therefor set one number in advance of the actual registration, thereby causing it to print the correct consecutive number for the fare registered and upon the return movement of the slide bar it is advanced one point so as to be ready to print the consecutive number for the next fare received. It will be apparent that we have provided a fare register which can be quickly and easily operated to indicate and record in penny multiples fares of any denomination within the capacity of the machine and that the machine will register relatively large amounts. Further, we have combined with the fare indicating and recording devices passenger indicating and recording devices, zone indicating and recording devices, direction indicating and recording devices, and printing mechanism operated by the registering devices to take a record of the detail fares and related items upon each operation of the register. Further, the machine is so controlled and locked as to make it necessary to perform the several operations in their proper sequence and to insure an accurate record.

It will be apparent that the indicating mechanism may be used, either in part or in its entirety, independently of the other features of the mechanism here illustrated and described. If desired, this indicating mechanism may be embodied in a separate device, or auxiliary indicator, such as is frequently employed in connection with a fare indicator, but is mounted independently of the fare recorder so as to indicate the registrations at points remote from the recorder.

While we are aware that various details of construction forming a part of the machine are old in the art, we have combined these old features and certain new features in such a manner as to produce the above specified results. Therefore, while we have shown and described one embodiment of our invention we wish it to be understood that we do not desire to be limited to the details thereof, as various modifications may occur to a person skilled in the art. Further, we wish it to be understood that while the invention was designed primarily for recording of fares on street cars and the like it is not limited to such use, and the word "fare" as herein used is intended to include any sum of money collected and of which it may be desirable to preserve a record, such for example as the price of admission to a theatre.

Having now fully described our invention what we claim as new and desire to secure by Letters Patent, is:

1. In a mechanism of the character described, a penny-multiple fare indicator having three series of digits to indicate respectively units, tens and hundreds, and comprising two independently operable indicating devices, one of which bears one series of digits and the other of which carries two series of digits, separate operating devices for the respective indicating devices, type wheels, means actuated by the respective operating devices to set said type wheels to print the item indicated by said indicator, printing mechanism to take a record from said type wheels, normally inoperative devices to hold said indicating devices against movement, and means to render said holding devices operative during the printing operation.

2. In a mechanism of the character described, a penny-multiple fare indicator having three series of digits to indicate respectively units, tens and hundreds, and comprising two independently operable indicating devices, one of which bears one series of digits and the other of which carries two series of digits, two type wheels having type corresponding to the digits on the respective indicating devices, two operating devices, each operating device having geared connection with one of said indicating devices and its type wheel, printing mechanism to take a record from said type wheels, normally inoperative devices to hold said indicating devices against movement, and means to render said holding devices operative during the printing operation.

3. In a mechanism of the character described, a penny-multiple fare indicator having three series of digits to indicate respectively units, tens and hundreds, and comprising two independently operable indicating devices, one of which carries one series of digits and the other of which carries two series of digits, separate operating devices for the respective indicating devices, type wheels, means actuated by the respective operating devices to set said type wheels and print the item indicated by said indicator, printing mechanism to take a record from said type wheels, means for actuating said printing devices, normally inoperative devices to hold said indicating devices against movement, and means operated by the actuating means for said printing devices to render said holding means operative.

4. In a mechanism of the character described, a penny-multiple fare indicator having three series of digits to indicate respectively units, tens and hundreds, and comprising two independently operable indicating devices, one of which bears one series of digits and the other of which carries two series of digits, separate operating devices for the respective indicating devices, type wheels, means actuated by the respective operating devices to set said type wheels to print the item indicated by said indicator, printing mechanism to take a record from said type wheels, a disk secured to each of said indicating devices for rotation therewith and having peripheral recesses, a detent engaging said disk and normally free to move into and out of said recesses as the disk rotates, a device adapted to hold said detent in one of said recesses to prevent the movement of said disk, and an actuating device for said printing mechanism operatively connected with the device which holds said detent in engagement with said disk.

5. In a mechanism of the character described, a penny-multiple fare indicator having three series of digits to indicate respectively units, tens and hundreds, and comprising two independently operable indicating devices, one of which bears one series of digits and the other of which carries two series of digits, separate operating devices for the respective indicating devices, type wheels, means actuated by the respective operating devices to set said type wheels to print the item indicated by said indicator, printing mechanism to take a record from said type wheels, means for actuating said printing mechanism comprising a slidable member, a disk connected with each of said indicating devices for rotation therewith and having peripheral recesses, a rock arm having a part adapted to enter said recesses and normally free to move into and out of said recesses as said disk rotates, a second rock arm having a part to engage the first arm to hold the same in engagement with said disk, and means operated by said slidable member to move said second rock arm into engagement with the first rock arm.

6. In a mechanism of the character described, a penny-multiple fare indicator having three series of digits to indicate respectively units, tens and hundreds, and comprising two independently operable indicating devices, one of which carries one series of digits and the other of which carries two series of digits, separate operating devices for respectively indicating devices, type wheels, means actuated by the respective operating devices to set said type wheels to print the item indicated by said indicator, printing mechanism to take a record from said type wheels, means for actuating said printing mechanism comprising a slidable member, a disk connected with each of said indicating devices for rotation therewith and having peripheral recesses, a rock arm having a part adapted to enter said recesses and normally free to move into and out of said recesses as said disk rotates, a second rock arm having a part to engage the first arm to hold the same in engagement with said disk, an arm connected with said second rock arm and having a cam surface, a lever having a part to engage the last mentioned arm and move said second rock arm into engagement with the first rock arm, and an operative connection between said lever and said slidable member.

7. In a mechanism of the character described, a fare register having three series of digits to indicate respectively units, tens and hundreds, and comprising two independently operable indicating devices, one of which carries one series of digits and the other of which carries two series of digits, separate operating devices for the respective indicating devices, a registering device to register the number of fares received, means for actuating said registering device, normally inoperative devices to hold said indicating devices against movement, and means operated by the actuating device for said registering device to render said holding device operative.

8. In a mechanism of the character described, a fare register having three series of digits to indicate respectively units, tens and hundreds and comprising two independently operable indicating devices one of which carries one series of digits and the other of which carries two series of digits, separate operating devices for the respective indicating devices, a registering device to register the number of fares received, means for actuating said registering device comprising a slidable member, a disk connected with each of said indicating devices for rotation therewith and having peripheral recesses, a detent adapted to enter any one of said recesses and normally free to move into and out of the same as said disk rotates, a device to engage said detent and hold the same in one of said recesses, and an operative connection between the last mentioned device and said slidable member.

9. In a mechanism of the character described, a fare register having three series of digits to indicate respectively units, tens and hundreds and comprising two independently operable indicating devices, one of which carries one series of digits and the other of which carries two series of digits, separate operating devices for the respective indicating devices, fare recording devices, means actuated by the respective operating devices to set said recording devices to print the item indicated by said indicating devices, a passenger indicator, a passenger recording device, printing mechanism to take a record from said recording devices, a single device for actuating said passenger indicator, said passenger recording devices and said printing mechanism, normally inoperative devices to aline said fare indicator devices and said fare recording devices and to hold the same against movement, and means operated by said single actuating devices to render said alining and holding device operative.

10. In a mechanism of the character described, a fare register having three series of digits to indicate respectively units, tens and hundreds and comprising two independently operable indicating devices, one of which carries one series of digits and the other of which carries two series of digits, separate operating devices for the respective indicating devices, fare recording devices, means actuated by the respective operating devices to set said recording devices to print the item indicated by said indicating devices, printing mechanism to take a record from said recording devices, means for actuating said printing mechanism, an actuating device for said printing mechanism, a disk connected with each of said fare indicating devices for rotation therewith and having peripheral recesses, a detent adapted to enter said recesses and normally free to move into and out of the same as said disk rotates, a flash, a connection between said flash and said detent, whereby the movement of said detent will move said flash into its operative position, means to retain said flash in said operative position independently of said detent, and means controlled by the actuating means for said printing mechanism to release said flash from said holding means.

11. In a mechanism of the character described, a fare register having three series of digits to indicate respectively units, tens and hundreds and comprising two independently operable indicating devices, one of which carries one series of digits and the other of which carries two series of digits, separate operating devices for the respective indicating devices, fare recording devices, means actuated by the respective operating devices to set said recording devices to print the item indicated by said indicating devices, printing mechanism to take a record from said fare recording devices, a slidable member for operating said printing mechanism, a disk connected with each of said fare indicating devices for rotation therewith and having peripheral recesses, a rock arm having a part adapted to enter said recesses and normally free to move into and out of the same as said disk rotates, a flash, a detent to hold said flash in an operative position, a link connected at one end with said rock arm and having at its other end a slotted connection with said flash whereby the movement imparted to said rock arm by the rotation of said disk will move said flash into its operative position and said rock arm will be free to move independently of said flash when the latter is in its operative position, and a trip arm connected with the detent for said flash and arranged to be operated by said slidable member.

12. In a mechanism of the character described, a fare indicator, a fare recorder, means for actuating said indicator and said recorder, printing mechanism to take a record from said fare recorder, an actuating device for said printing mechanism, a disk connected to and rotatable with said indicator and having peripheral recesses, a detent engaging said disk and normally free to move into and out of said recesses as the disk rotates, a device to engage said detent and positively hold the same in one of said recesses, and an operative connection between said device and the operating device for said printing mechanism whereby the indicator will be held against movement during the printing operation.

13. In a mechanism of the character described, a fare indicator, a fare recorder having geared connection with said indicator, means for operating said indicator and said recorder, printing mechanism, means for actuating said printing mechanism, a disk secured to said indicator for rotation therewith and having peripheral recesses, a detent having a part adapted to enter the recesses in said disk and normally free to move into and out of said recesses as the disk rotates, a device to engage said detent to force the same into one of said recesses and retain the same therein, and an operative connection between said device and the operating device for said printing mechanism whereby said indicator and said recorder will be moved into true position and retained in that position during the printing operation.

14. In a mechanism of the character described, a fare indicator, a fare recorder, means for operating said indicator and said recorder, printing mechanism to take a record from said recorder, means for actuating said printing mechanism, a disk connected to and rotatable with said indicator and having peripheral recesses, a pivoted arm having a part adapted to enter the recesses in said disk, said arm being normally free to move to permit said part to move into and out of said recesses as the disk rotates, a second arm having a part adapted to engage the first mentioned arm to hold the same in one of said recesses, and means actuated by the actuating device for said printing mechanism to move said second arm into engagement with the first mentioned arm and hold the same in engagement therewith during the printing operation.

15. In a mechanism of the character described, a fare indicator, a fare recorder, means for operating said indicator and said recorder, a device comprising a slidable member to operate said printing mechanism, a disk connected with said indicator for rotation therewith, and having peripheral recesses, a rock arm having a part adapted to enter said recesses and normally free to permit said part to move into and out of said recesses as said disk rotates, a second arm having a part to engage the first mentioned arm and hold the same in one of said recesses, a member connected with said second arm and having a cam shaped edge, a lever having a part to engage the edge of said member, and an operative connection between said lever and said slidable member.

16. In a mechanism of the character described, a fare indicator, a fare recorder, means for operating said indicator and said recorder, printing mechanism to take a record from said recorder, means for actuating said printing mechanism, a disk connected to and rotatable with said indicator and having peripheral recesses, a pivoted arm having a part adapted to enter the recesses in said disk, said arm being normally free to move to permit said part to move into and out of said recesses as the disk rotates, a second arm having a part adapted to engage the first mentioned arm to hold the same in one of said recesses, means actuated by the actuating device for said printing mechanism to move said second arm into engagement with the first mentioned arm and hold the same in engagement therewith during the printing operation, a flash for said indicator, a link pivotally connected with the first mentioned arm and having a pin and slot connection with said flash to cause said flash to be moved into an operative position when said part of said arm is moved out of one of said recesses, a detent to retain said flash in its operative position, and means for releasing said detent at the conclusion of the printing operation.

17. In a mechanism of the character described, a fare indicator, means for setting said indicator, a zone indicator, a toothed wheel operatively connected with said zone indicator, an arm pivoted on the axis of said toothed wheel, a pawl pivotally mounted on said arm and having a nose on each side of its axis, one of said noses being adapted to engage said toothed wheel when the pawl is in one position and the other being adapted to engage said toothed wheel when the pawl is in the other position, a yieldable detent to hold said pawl in either position, means to shift said pawl from one position to the other, means for actuating said arm to cause said pawl to actuate said ratchet wheel when it is in either position, an arm mounted on each side of said toothed wheel, a detent connected with said arm, and a part carried by each end of said pawl to engage one of said arms and move its detent into the path of a tooth on said toothed wheel, thereby checking the movement of said wheel.

18. In a mechanism of the character described, a fare indicator, means for setting said indicator, a zone indicator, a toothed wheel operatively connected with said zone indicator, an arm pivoted on the axis of said toothed wheel, a pawl pivotally mounted on said arm and having a nose on each side of its axis, one of said noses being adapted to engage said toothed wheel when the pawl is in one position and the other being adapted to engage said toothed wheel when the pawl is in the other position, a yieldable detent to hold said pawl in either position, means to shift said pawl from one position to the other, means for actuating said arm to cause said pawl to actuate said ratchet wheel when it is in either position, an arm mounted on each side of said toothed wheel, a detent connected with each arm, each of said arms having its free end beveled, pins carried by said pawl near the respective noses thereof and so arranged that the pin adjacent to that nose which is in operative position will engage the beveled end of the adjacent arm and move the detent of that arm into a position to engage a tooth of said toothed wheel, thereby checking the movement of the latter.

19. In a mechanism of the character described, a fare indicator, means for setting said indicator, a zone indicator comprising two indicating devices, means for actuating one of said indicating devices, means for transferring the count from the first mentioned indicating device to the other indicating device, zone recording type wheels, and means operated by said transfer mechanism for actuating said type wheels.

20. In a mechanism of the character described, a fare indicator, means for setting said indicator, a zone indicator comprising a units indicating wheel and a tens indicating wheel, a zone recording device comprising a units type wheel and a tens type wheel, a ten toothed gear carried by the units indicator wheel, a ten toothed transfer gear meshing with the gear on said units wheel, a one toothed gear connected with said transfer gear, a Geneva gear connected with the tens indicator wheel and arranged to be actuated by said one toothed gear, a ten toothed gear connected with said units type wheel and meshing with said transfer gear, a gear connected with the tens type wheel, and a second one toothed gear connected with said transfer gear and arranged to engage the gear on said tens type wheel.

21. In a mechanism of the character described, a fare indicator, means for setting said indicator, a direction indicator, means for actuating said direction indicator, a zone indicator, a toothed wheel connected with said zone indicator, a reversible double pawl cooperating with said toothed wheel to move the same in either direction, yieldable means for retaining said pawl in either position, and means actuated by said direction indicator to reverse the position of said pawl.

22. In a mechanism of the character described, a fare indicator, means for setting said indicator, a direction indicator, means for actuating said direction indicator, a zone indicator, a toothed wheel connected with said zone indicator, a reversible double pawl cooperating with said toothed wheel to move the same in either direction, yieldable means for retaining said pawl in either position, an operating bar connected at one end with said direction indicator, and means connected with the other end of said bar to engage said pawl and shift the same from either position to the other position.

23. In a mechanism of the character described, a fare indicator, means for setting said indicator, a direction indicator, means for actuating said direction indicator, a zone indicator, a toothed wheel connected with said zone indicator, a reversible double pawl cooperating with said toothed wheel to move the same in either direction, yieldable means for retaining said pawl in either position, an actuating bar connected with said direction indicator, a pivoted arm connected with the other end of said bar, and a projection carried by said bar and spaced from said arm, said pawl having a part arranged between said arm and said projection, whereby the shifting of said direction indicator will reverse the position of said pawl.

24. In a mechanism of the character described, a fare indicator, means for setting said indicator, a passenger counter, means for resetting said passenger counter, a zone indicator, a toothed wheel connected with said zone indicator, a reversible double pawl cooperating with said toothed wheel to move the same in either direction, a yieldable detent to hold said pawl in either of its positions, and means controlled by the resetting of said passenger counter to reverse the position of said pawl.

25. In a mechanism of the character described, a fare indicator, means for setting said indicator, a passenger counter, means for resetting said passenger counter, a zone indicator, a toothed wheel connected with said zone indicator, a reversible double pawl cooperating with said toothed wheel to move the same in either direction, a yieldable detent to hold said pawl in either of its positions, means controlled by the resetting of said passenger counter to reverse the position of said pawl, and means for locking said pawl against operation while said passenger counter is being reset and for locking said resetting means against operation while said pawl is being operated.

26. In a mechanism of the character described, a fare indicator, means for setting the same, a passenger indicator comprising a resetting shaft and a plurality of indicator wheels rotatably mounted on said shaft, means actuated by the rotation of said shaft for resetting said counter wheels to zero, a gear connected with said shaft, a second shaft, means for rotating the same and for imparting axial movement thereto, a pinion carried by said second shaft and meshing with said gear, a plate carried by said second shaft, said plate having a projection adapted to engage said gear and hold the same against rotation when said resetting shaft is in its normal position and adapted to be disengaged therefrom by the axial movement of said second shaft, a zone indicator, a toothed wheel connected with said zone indicator, a reversible double pawl cooperating with said toothed wheel to move said indicator in either direction, yieldable means for holding said pawl in either position, means for imparting operative movement to said pawl when it is in either position, means actuated by the resetting shaft for said passenger counter to reverse the position of said pawl, a locking member operatively connected with said pawl and arranged to be moved into the path of said plate to hold the same against axial movement during the operation of said pawl, and so arranged that said plate will lie in the path thereof when axial movement has been imparted to said second shaft, thereby locking said pawl against operation.

27. In a mechanism of the character described, a fare indicator, means for setting the same, a passenger counter comprising a resetting shaft and a plurality of counter wheels mounted thereon, means actuated by the rotation of said shaft for moving said counter wheels to zero position, means for actuating said resetting shaft, a direction indicator, means actuated by said resetting shaft to move said direction indicator from one position to another, a zone indicator, a toothed wheel connected with said zone indicator, a reversible double pawl adapted to actuate said toothed wheel in either direction, yieldable means for holding said pawl in either position, means to impart operative movement to said pawl when it is in either position, and means actuated by said direction indicator to reverse the position of said pawl.

28. In a mechanism of the character described, a penny-multiple fare indicator having three series of digits to indicate respectively units, tens and hundreds, and comprising two independently operable indicating devices, one of which carries one series of digits and the other of which carries two series of digits, separate operating devices for the respective indicating devices, a zone indicator, a toothed wheel connected with said zone indicator, a reversible double pawl adapted to move said toothed wheel in either direction, yieldable means for retaining said pawl in either position, means for imparting operative movement to said pawl when it is in either position, a direction indicator, means for shifting said direction indicator from one position to another, and means actuated by the movement of said direction indicator to reverse the position of said pawl.

29. In a mechanism of the character described, the combination with a fare indicator, a fare recorder, and means for actuating said indicator and said recorder, of printing mechanism for taking a record from said recorder and comprising a platen mounted for bodily movement into and out of printing position, a shaft extending parallel with said platen, a disk mounted on said shaft, a pitman connecting the said disk with said platen, an actuating device comprising a rack, and a pinion meshing with said rack and connected with said shaft.

30. In a mechanism of the character described, the combination with a fare indicator, a fare recorder, and means for actuating said indicator and said recorder, of a printing mechanism to take a record from said recorder and comprising a platen, a pivoted support for said platen, an actuating device comprising a rack, a pinion meshing with said rack, means comprising a pitman for connecting said pinion with said platen to impart swinging movement thereto, a gear connected with said platen, and a stationary rack with which said gear meshes whereby said platen is rotated about its longitudinal axis when bodily swinging movement is imparted thereto.

31. In a mechanism of the character described, the combination with a fare indicator, a fare recorder, and means for actuating said indicator and said recorder, of a printing mechanism for taking a record from said recorder comprising a platen, a pivoted support for said platen, means for actuating said support to impart bodily movement to said platen, a gear connected with said platen, and a stationary rack with which said gear meshes, whereby said gear will be rotated about its longitudinal axis when bodily swinging movement is imparted thereto.

32. In a mechanism of the character described, the combination with a fare indicator, a fare recorder, and means for actuating said indicator and said recorder, of a printing mechanism for taking a record from said recorder comprising a platen, a pivoted support for said platen, means for actuating said support to impart bodily movement to said platen, a gear connected with said platen, a stationary rack with which said gear meshes, whereby said gear will be rotated about its longitudinal axis when bodily swinging movement is imparted thereto, arms pivotally mounted on the support for said platen, an inking roller carried by said arms, a spring acting on said rollers to move the same toward said recorder, and stationary cams to control the position of said inking rollers.

33. In a machine of the character described, the combination with a fare indicator, a fare recorder, and means for actuating said indicator and said recorder, of a printing mechanism for taking a record from said recorder comprising a platen, a pivoted support for said platen, means for actuating said support to impart bodily movement to said platen, a gear connected with said platen, a stationary rack with which said gear meshes, whereby said gear will be rotated about its longitudinal axis when bodily swinging movement is imparted thereto, and automatically operated means to positively check the movement of said platen.

34. In a mechanism of the character described, the combination with a fare indicator, a fare recorder, and means for actuating said indicator and said recorder, of a printing mechanism for taking a record from said recorder comprising a platen, a pivoted support for said platen, a shaft, a disk mounted on said shaft, a pitman connecting said disk with the support for said platen, an actuating device comprising a rack, a gear meshing with said rack, and an operative connection between said gear and said shaft comprising a one way clutch.

35. In a mechanism of the character described, the combination with a fare indicator, a fare recorder, and means for actuating said indicator and said recorder, of a printing mechanism for taking a record from said recorder comprising a platen, a pivoted support for said platen, a shaft a disk mounted on said shaft, a pitman connecting said disk with the support for said platen, an actuating device comprising a rack, a gear meshing with said rack, an operative connection between said gear and said shaft, a stop rigidly secured to said shaft, a pawl pivotally mounted on a fixed axis adjacent to said shaft and having a part movable into and out of the path of said stop, an arm connected with said pawl and having a part engaging said actuating device to normally hold said pawl in an inoperative position, said part being so arranged that the actuating device will pass beyond the same and permit said pawl to move into an operative position when said platen has completed its movement.

36. In a mechanism of the character described, the combination with a fare indicator, a fare recorder, and means for actuating said indicator and said recorder of a printing mechanism for taking a record from said recorder and comprising a frame pivotally mounted near its rear edge and arranged beneath said recorder, supporting members pivotally mounted on said frame, a platen rotatably mounted on said supporting members, an actuating device, an operative connection between said actuating device and said supporting members comprising a pitman, a rack carried by said frame, a gear connected with said platen and meshing with said rack, and means for supporting said frame normally in its operative position.

37. In a mechanism of the character described, the combination with a fare indicator, a fare recorder, and means for actuating said indicator and said recorder, of a printing mechanism to take a record from said recorder, means for actuating said printing mechanism, a paper feeding device comprising a rewinding roller, a ratchet wheel connected with said rewinding roller, a pawl to engage said ratchet wheel, and means controlled by the paper on said rewinding roller to regulate the amount of movement imparted to said ratchet wheel by said pawl.

38. In a mechanism of the character described, the combination with a fare indicator, a fare recorder, and means for actuating said indicator and said recorder, of a printing mechanism to take a record from said recorder, means for actuating said printing mechanism, a paper feeding device comprising a rewinding roller, a ratchet wheel connected with said rewinding roller, a pawl to engage said ratchet wheel, an arm to support said pawl in operative relation to said ratchet wheel, means controlled by the operation of said printing mechanism for operating said arm and said pawl, a segmental plate movable about the axis of said ratchet wheel and projecting beyond the edge thereof and arranged to engage said pawl and hold the same out of engagement with said ratchet wheel during a portion of its stroke, and means controlled by the paper on said rewinding roller to control the position of said segmental plate.

39. In a mechanism of the character described, the combination with a fare indicator, a fare recorder, and means for actuating said indicator and said recorder, of a printing mechanism to take a record from said recorder, means for actuating said printing mechanism, a paper feeding device comprising a rewinding roller, a ratchet wheel connected with said rewinding roller, a pawl to engage said ratchet wheel, an arm to support said pawl in operative relation to said ratchet wheel, means controlled by the operation of said printing mechanism for operating said arm and said pawl, a segmental plate movable about the axis of said ratchet wheel and projecting beyond the edge thereof and arranged to engage said pawl and hold the same out of engagement with said ratchet wheel during a portion of its stroke, a shaft, an operative connection between said shaft and said segmental plate, and an arm carried by said shaft and arranged to bear upon the roll of paper on said rewinding roller.

40. In a mechanism of the character described, a fare indicator having three series of digits to indicate respectively units, tens and hundreds and comprising two independently operably indicating devices, one of which carries one series of digits and the other of which carries two series of digits, separate operating devices for the respective indicating devices, type wheels, means actuated by the respective operating devices to set said type wheel to print the item indicated by said indicator, passenger indicators and recording devices, means comprising a slide bar to actuate said passenger indicating and recording devices, printing mechanism for taking a record from said recording devices and comprising a platen mounted for swinging movement into and out of operative position, and means actuated by said slide bar for operating said platen.

41. In a mechanism of the character described, a fare indicator having three series of digits to indicate respectively units, tens and hundreds and comprising two independently operable indicating devices, one of which carries one series of digits and the other of which carries two series of digits, separate operating devices for the respective indicating devices, type wheels, means actuated by the respective operating devices to set said type wheels to print the item indicated by said indicator, passenger indicators and recording devices, means comprising a slide bar to actuate said passenger indicating and recording devices, printing mechanism for taking a record from said recording devices and comprising a platen mounted for swinging movement into and out of operative position, means actuated by said slide bar for operating said platen, a locking member pivotally mounted adjacent to said slide bar and having its end movable into and out of the path of a part thereof, a lever operatively connected with said locking lever, and key-controlled means for actuating said lever.

42. In a mechanism of the character described, a fare indicator having three series of digits to indicate respectively units, tens and hundreds and comprising two independently operable indicating devices, one of which carries one series of digits and the other of which carries two series of digits, separate operating devices for the respective indicating devices, type wheels, means actuated by the respective operating devices to set said type wheels to print the item indicated by said indicator, passenger indicating and recording devices, means comprising a slide bar to actuate said passenger indicating and recording devices, zone indicating and recording devices, means for actuating said zone indicating and recording devices, printing mechanism to take a record from said recording devices and comprising a platen having both bodily movement and rotatory movement, a rack connected with said slide bar, a pinion meshing with said rack, a connection between said pinion and said platen comprising pitmen, a gear connected with said platen, and a stationary rack with which said gear meshes.

43. In a mechanism of the character described, an indicator, means for actuating said indicator, means for resetting said indicator, a zone indicator, an actuating device for said zone indicator comprising a toothed member connected therewith, a reversible pawl adapted to move said toothed member in either direction, means for actuating said pawl, and means controlled by the resetting of the first mentioned indicator to reverse said pawl.

44. In a mechanism of the character described, an indicator, means for actuating said indicator, means for resetting said indicator, a zone indicator, an actuating device for said zone indicator comprising a toothed member connected therewith, a reversible pawl adapted to move said toothed member in either direction, means controlled by said resetting means for reversing the position of said pawl, yieldable means to hold said pawl in either position, and means for actuating said pawl when it is in either position.

45. In a mechanism of the character described, a zone indicator, a toothed wheel operatively connected with said zone indicator, an arm pivoted on the axis of said toothed wheel, a pawl pivotally mounted on said arm and having a nose on each side of its axis, one of said noses being adapted to engage said toothed wheel when the pawl is in one position and the other nose being adapted to engage said toothed wheel when the pawl is in the other position, a yieldable detent to hold said pawl in either position, a shifting device for said pawl comprising separated parts, said pawl having a portion arranged between said parts, and means for actuating said arm to cause said pawl to actuate said ratchet wheel when the pawl is in either position.

46. In a mechanism of the character described, a zone indicator, a toothed wheel operatively connected with said zone indicator, an arm pivoted on the axis of said toothed wheel, a pawl pivotally mounted on said arm and having a nose on each side of its axis, one nose of said pawl being adapted to engage the toothed wheel when the pawl is in one position and the other nose being adapted to engage said toothed wheel when the pawl is in the other position, said pawl having a part extending beyond one nose thereof, a pawl shifting member mounted for longitudinal movement, a projection carried by said member to engage one edge of said part of said pawl, a rock arm connected with said member and arranged to engage the other edge of said part of said pawl, means for operating said member, a yieldable detent to retain said pawl in either position, and means for actuating said pawl carrying arm.

In testimony whereof, we affix our signatures hereto.

JOHN F. OHMER.
CHARLES W. KETTEMAN.